United States Patent
Jovicevic

(10) Patent No.: US 9,199,558 B1
(45) Date of Patent: Dec. 1, 2015

(54) VEHICLE SEAT ASSEMBLY

(71) Applicant: Nissan North America, Inc., Franklin, TN (US)

(72) Inventor: Niko Jovicevic, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/473,434

(22) Filed: Aug. 29, 2014

(51) Int. Cl.
*B60N 2/42* (2006.01)
*B60N 2/68* (2006.01)
*B60R 21/231* (2011.01)
*B60R 21/00* (2006.01)

(52) U.S. Cl.
CPC ........... *B60N 2/4256* (2013.01); *B60N 2/42* (2013.01); *B60N 2/4235* (2013.01); *B60N 2/68* (2013.01); *B60R 21/23138* (2013.01); *B60R 2021/0006* (2013.01); *B60R 2021/0044* (2013.01); *B60R 2021/23146* (2013.01)

(58) Field of Classification Search
CPC ...... B60N 2/4256; B60N 2/42; B60N 2/4235; B60N 2/68; B60N 2/449; B60N 2002/5808; B60R 21/23138; B60R 21/207; B60R 2021/0006; B60R 2021/0044; B60R 2021/23146
USPC ........................................... 280/730.2, 728.2
See application file for complete search history.

(56) References Cited

U.S. PATENT DOCUMENTS

| | | | |
|---|---|---|---|
| 5,651,582 | A | 7/1997 | Nakano |
| 7,708,343 | B2 | 5/2010 | Kayumi et al. |
| 8,172,320 | B2 | 5/2012 | Kalinowski |
| 8,602,449 | B2 | 12/2013 | Kojima |
| 8,727,374 | B1* | 5/2014 | Line et al. ................. 280/728.3 |
| 2009/0309340 | A1* | 12/2009 | Okada et al. ............... 280/730.2 |
| 2012/0223550 | A1* | 9/2012 | Mazanek et al. ........... 297/216.1 |
| 2013/0147243 | A1* | 6/2013 | Lee et al. .................. 297/216.13 |
| 2013/0292929 | A1* | 11/2013 | Fukawatase ............... 280/730.2 |
| 2014/0183846 | A1* | 7/2014 | Fujiwara et al. ............. 280/729 |
| 2014/0197621 | A1* | 7/2014 | Thomas ..................... 280/730.2 |

FOREIGN PATENT DOCUMENTS

JP    2008-220640 A    9/2008

* cited by examiner

*Primary Examiner* — Paul N Dickson
*Assistant Examiner* — Darlene P Condra
(74) *Attorney, Agent, or Firm* — Global IP Counselors, LLP

(57) ABSTRACT

A vehicle seat assembly includes a seatback with a seatback frame having a first frame member with forward and rearward edges relative to the seatback being in an upright orientation. An airbag is positioned along an outboard lateral side of the first frame member and is deployable from a stowed orientation to a deployed orientation from the outboard lateral side of the first frame member such that in the deployed orientation at least a portion of the airbag is located forward of the forward edge of the first frame member. A guide member is non-movably coupled to the first frame member. The guide member deflects a portion of an occupant of the vehicle seat assembly toward the airbag forward of the forward edge of the first frame member with the airbag in the deployed orientation in response to a lateral impact event.

19 Claims, 8 Drawing Sheets

VEHICLE SEAT ASSEMBLY

BACKGROUND

1. Field of the Invention

The present invention generally relates to vehicle seat assembly. More specifically, the present invention relates to a seat assembly with a contact surface that is configured to urge the torso of a seat occupant toward a deployed airbag in response to a side impact event.

2. Background Information

Airbags have become standard features within vehicles. Airbags are installed at various locations within a vehicle, including within seat assemblies of the vehicle.

SUMMARY

One object of the disclosure is to provide a vehicle seat assembly with a guide member that directs movement of a seat occupant's torso in the direction of a deployed airbag in response to a lateral impact event.

In view of the state of the known technology, one aspect of the disclosure includes a vehicle seat assembly that includes a seatback, an airbag and a guide member. The seatback includes a seatback frame having a first frame member and a second frame member extending along opposite lateral sides thereof. The first frame member has a forward edge and a rearward edge relative to the seatback being in an upright orientation. The airbag is positioned along the first frame member and is deployable from a stowed orientation to a deployed orientation from an outboard lateral side of the first frame member such that in the deployed orientation at least a portion of the airbag is located forward of the forward edge of the first frame member. The guide member is non-movably coupled to the first frame member and disposed between the first frame member and the second frame member. The guide member is configured to deflect a portion of an occupant of the vehicle seat assembly toward the airbag forward of the forward edge of the first frame member with the airbag in the deployed orientation in response to a lateral impact event.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
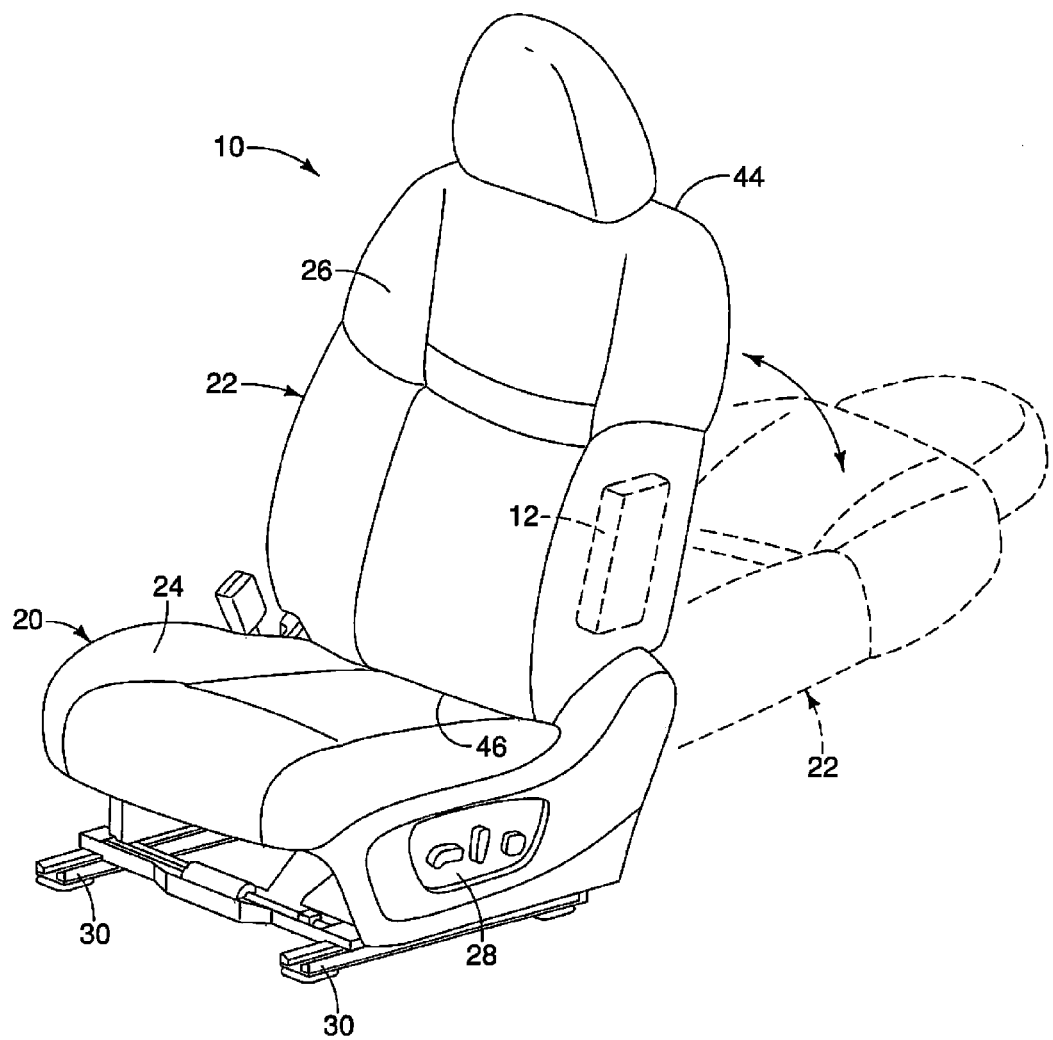
FIG. 1 is a perspective view of a seat assembly that includes a seating portion and a seatback pivotally supported to the seating portion, the seating portion and the seatback including a cover in accordance with a first embodiment.
Figure 2:
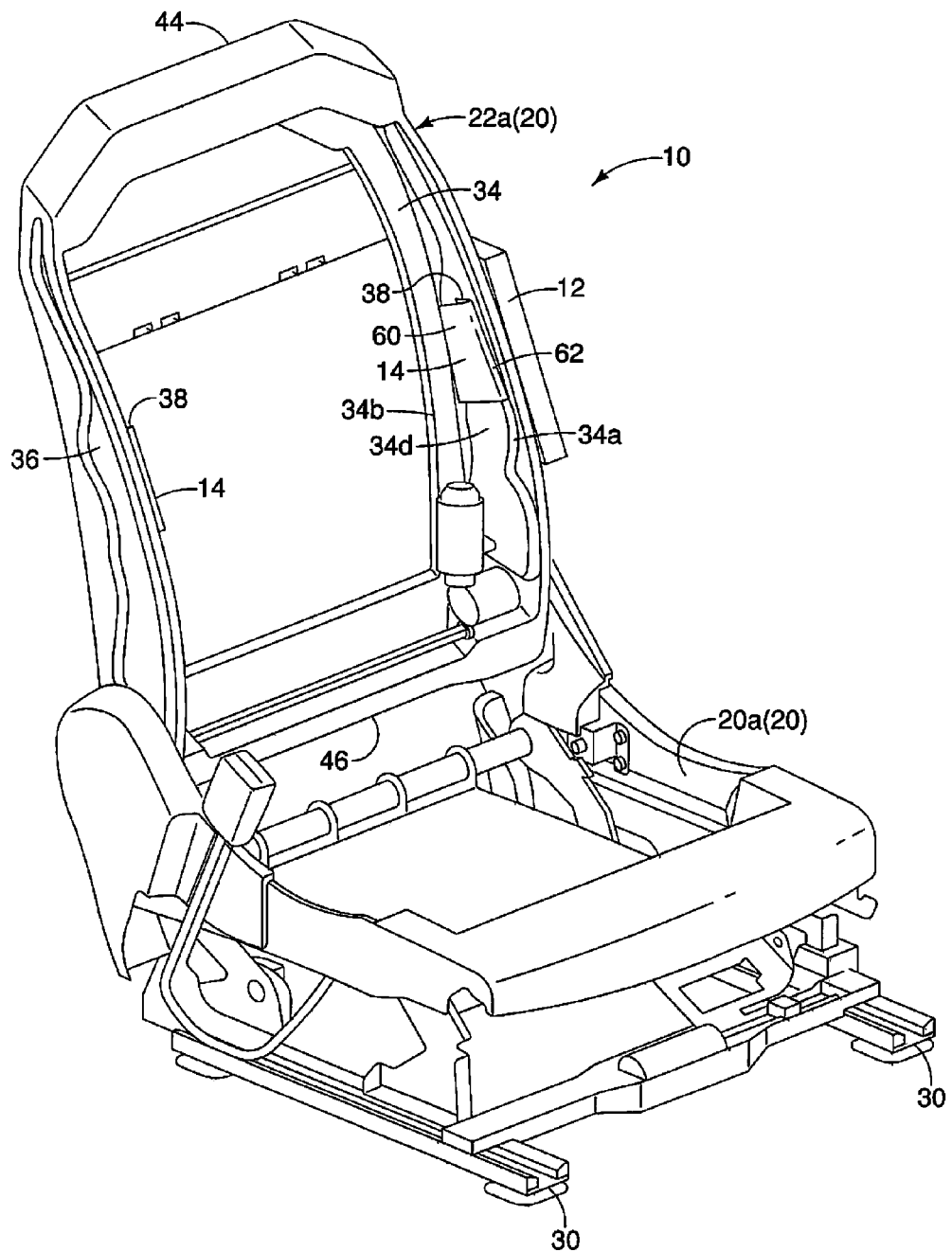
FIG. 2 is another perspective view of the seat assembly showing a seating portion frame of the seating portion and a seatback frame of the seatback with the covers and cushion materials removed revealing a guide member with a contact surface and an airbag device in accordance with the first embodiment.

Referring initially to FIGS. 1 and 2, a seat assembly 10 is illustrated in accordance with a first embodiment. The seat assembly 10 includes an airbag device 12 and a contact surface 14 (FIG. 2) that is configured to direct movement of a seat occupant's torso toward the airbag device 12 upon deployment in response to a lateral impact event, as described in greater detail below.

As shown in FIGS. 1 and 2, the seat assembly 10 includes a seating portion 20 and a seatback 22. The seating portion 20 includes a cover 24 and the seatback 22 includes a cover 26. In FIG. 2, the cover 24 and the cover 26 are removed to reveal a seating frame 20a of the seating portion 20 and a seatback frame 22a of the seatback 22.

As indicated in FIG. 1, the seatback 22 is movably supported to the seating portion 20 such that the seatback 22 can be oriented in an upright orientation (solid lines in FIG. 1), an inclined orientation (dashed lines in FIG. 1) and any of a plurality of intermediate orientations between the upright orientation and the inclined orientation. In the depicted embodiment, the seating portion 20 includes a control panel 28 that operates an electric motor (not shown) that positions the seatback 22, moving it between the upright orientation and the inclined orientation. However, it should be understood from the drawings and the description herein that the seatback 22 can be moved between the upright orientation and the inclined orientation manually using a mechanical lever operated mechanism (not shown) and spring biasing to assist in moving the seatback 22 toward the upright orientation from the inclined orientation.

As shown in FIG. 2, the seating frame 20a of the seating portion 20 includes brackets 30 that secure the seat assembly 10 to the floor (not shown) of a vehicle (not shown).

The seating portion 20 is configured to support an occupant in a conventional manner. Since seating portions of vehicle seat assemblies are conventional vehicle components, further description is omitted for the sake of brevity.

As shown in FIGS. 2, 3, 4 and 5, the seatback frame 22a of the seatback 22 includes, among other elements, a first frame member 34, a second frame member 36, a guide member 38, a cushion support structure 40 (FIG. 3 only) and the airbag device 12. The first frame member 34 and the second frame member 36 extend along opposite lateral sides of the seatback frame 22a. Further the first frame member 34 and the second frame member 36 extend in a vertical direction with the seatback 22 in the upright orientation shown in FIGS. 2, 3 and 5.

Figure 3:
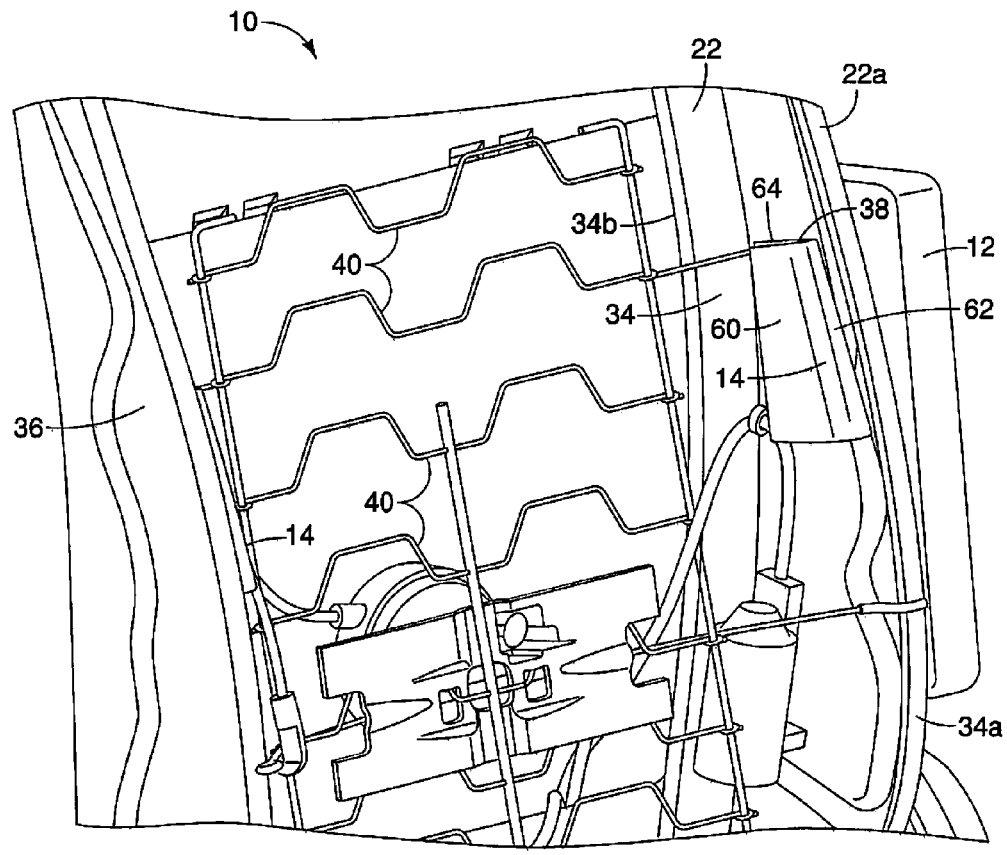
FIG. 3 is another perspective view of the seatback frame showing the airbag device and the guide member with the contact surface in accordance with the first embodiment.
Figure 4:
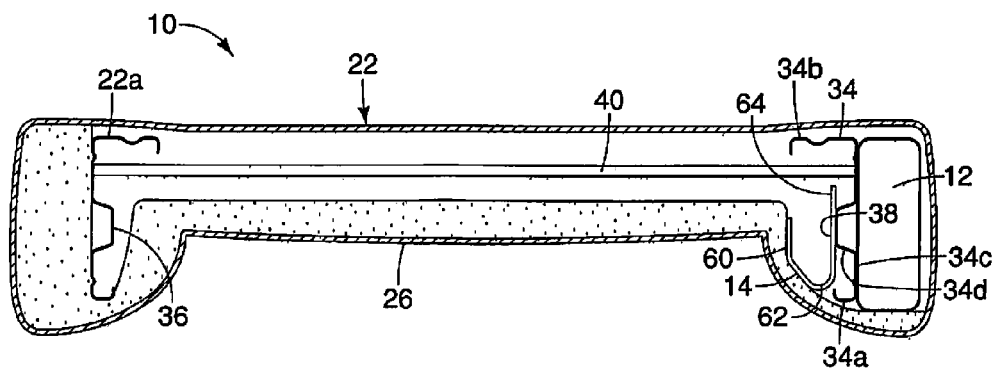
FIG. 4 is a cross-sectional view of the seatback showing the seatback frame, the airbag device and the guide member with the contact surface in accordance with the first embodiment.

As shown in FIGS. 3 and 4, the first frame member 34 has a forward edge 34a and a rearward edge 34b, an outboard side 34c, an inboard side 34d and includes the guide member 38. The guide member 38 defines the contact surface 14 (a ramp surface), as is described in greater detail below. Hence, the contact surface 14 is part of the first frame member 34.

The airbag device 12 is fixedly attached to the outboard side 34d of the first frame member 34 by, for example, mechanical fasteners or welding techniques. As shown in FIGS. 1 and 2, the airbag device 12 is located above the seating portion 20 at a mid-portion of the seatback 22, approximately centered between an upper end 44 of the seatback 22 and a lower end 46 of the seatback 22.

As explained in greater detail below, the airbag device 12 is deployable from a stowed orientation shown in FIG. 9 to a deployed orientation shown in FIG. 10. The airbag device 12 is deployable from the outboard side 34c (an outboard lateral side) of the first frame member 34 such that in the deployed orientation at least a portion of a deployed airbag 50 (FIG. 10) extends from the airbag device 12 to an area forward of the forward edge 34a of the first frame member 34. The deployed airbag 50 further deploys along an interior surface 52 of the vehicle. The interior surface 52 can be a wall section, a door section and/or window section of the vehicle.

Figure 5:
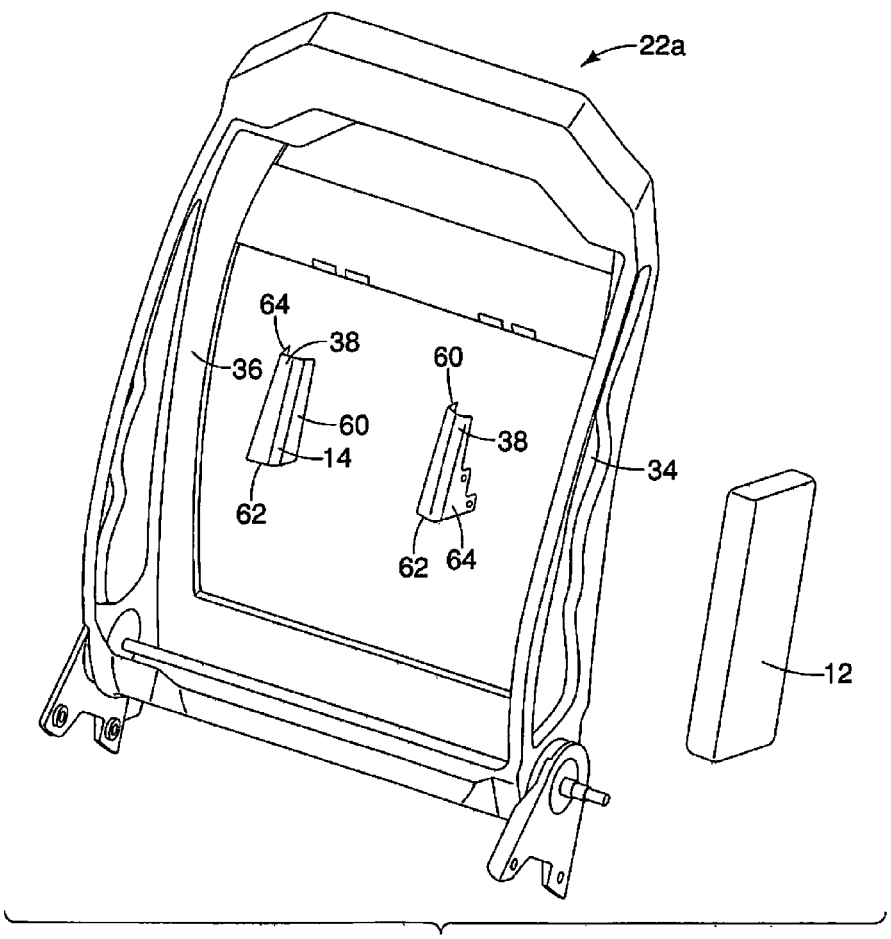
FIG. 5 is an exploded view of the seatback frame showing two guide members and the airbag device in accordance with the first embodiment.

As shown in FIGS. 3, 4, 5 and 8, the guide member 38 is fixedly and non-movably attached to the inboard side 34d of the first frame member 34 by mechanical fasteners F and is therefore located in an area between the first frame member 34 and the second frame member 36. Alternatively, the guide member 38 can be welded directly to the inboard side 34d of the first frame member 34. Further, as indicated in FIG. 5, the seat assembly 10 can further include a second one of the guide members 38, where the second guide member 38 is fixed to an inboard side of the second frame member 36. Since description of one guide member 38 applies equally to both, description is provided below for the guide member 38 fixed to the first frame member 34 for the sake of brevity.

Figure 6:
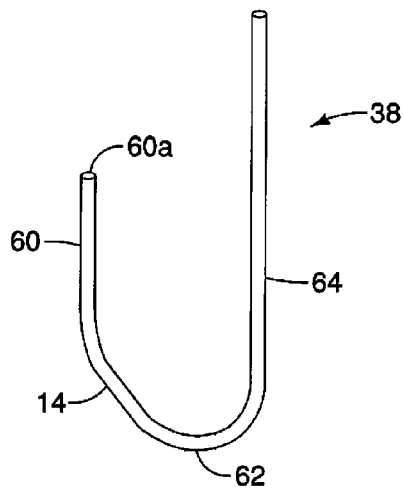
FIG. 6 is a top view of the guide member shown removed from the seatback frame in accordance with the first embodiment.
Figure 7:
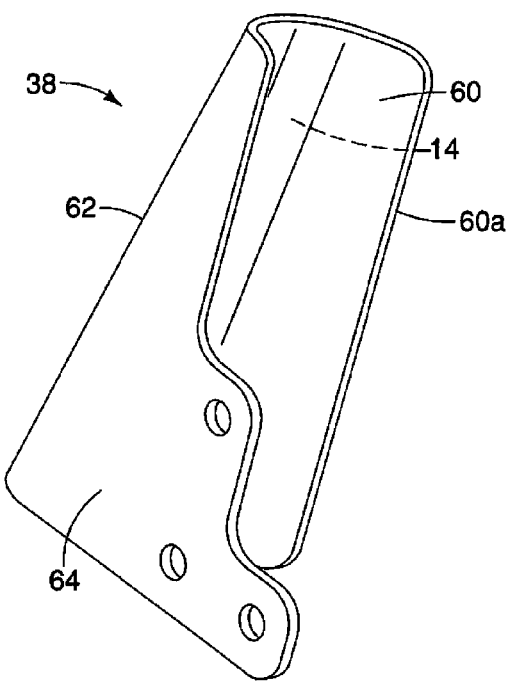
FIG. 7 is a perspective view of the guide member shown removed from the seatback frame in accordance with the first embodiment.
Figure 8:
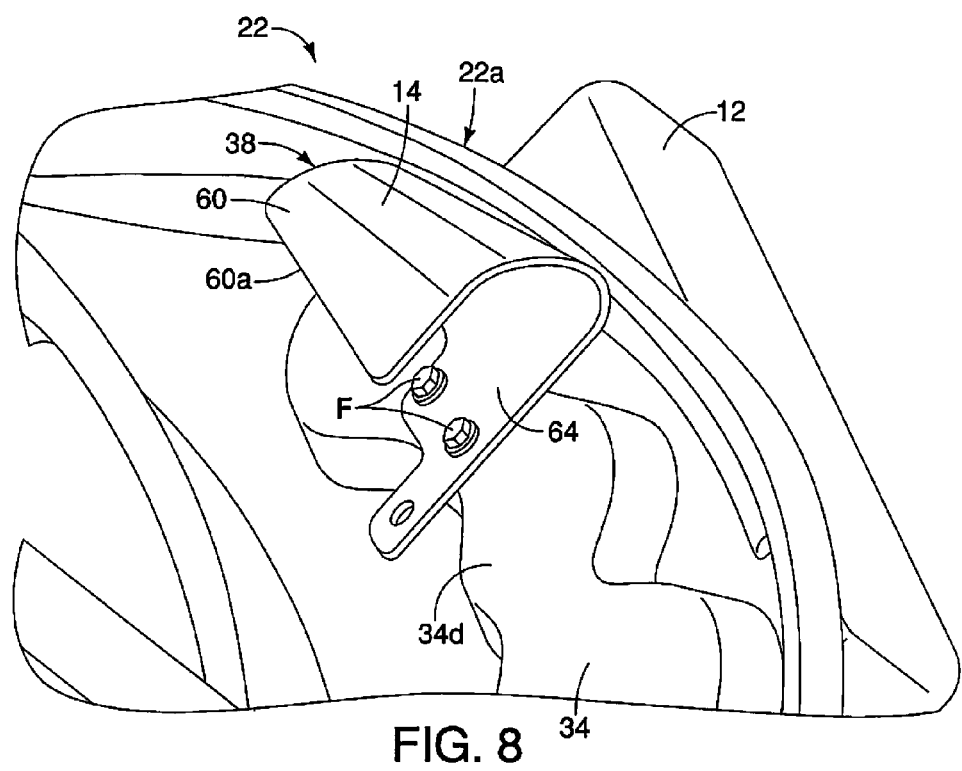
FIG. 8 is a perspective view of the seatback frame looking upward at the guide member in accordance with the first embodiment.

As shown in FIGS. 6, 7 and 8, the guide member 38 basically includes a guide portion 60, a front edge portion 62 and an attachment portion 64. The guide portion 60 is spaced laterally inboard of inboard side 34d of the first frame member 34 with the guide member 38 installed to the first frame member 34. The attachment portion 64, on the other hand, is directly attached to the first frame member 34 thereby supporting the guide portion 60. Further, the guide portion 60 has a rear edge 60a. The guide portion 60 is basically defined between the rear edge 60a and the front edge portion 62. The front edge portion 62 is located proximate the first frame member 34, but is preferably located rearward of the forward edge 34a of the first frame member 34. The rear edge 60a is spaced apart from the first frame member 34. Further, the rear edge 60a is free from attachment to the first frame member 34, as described in more detail below.

The front edge portion 62 of the guide member 38 extends between the attachment portion 64 and the guide portion 60. The front edge portion 62 is located adjacent to the forward edge 34a of the first frame member 34 but is preferably located no further forward than the forward edge 34a of the first frame member 34 with the seatback 22 positioned in the upright orientation.

The guide portion 60, the front edge portion 62 and the attachment portion 64 of the guide member 38 are preferably formed from a single piece of metal and are therefore unitarily formed as a single monolithic element. The guide member 38 defines a generally U-shaped structure as viewed in cross-section in FIG. 4 or from either end, as shown in FIG. 6. More specifically, a section of the guide portion 60 adjacent to the rear edge 60a and a majority of the attachment portion 64 are parallel to one another with the front edge portion 62 having a curved or arcuate shape and joining the guide portion 60 to the attachment portion 64. The rear edge 60a of the guide portion 60 is basically free from attachment being cantilevered out from the front edge portion 62.

The guide portion 60 of the guide member 38 defines the contact surface 14. The contact surface 14 is angled with respect to the attachment portion 64. More specifically, the contact surface 14 of the guide portion 60 is shaped and configured to engage a portion of a seat occupant's torso T in response to a side impact event, as shown in FIGS. 9 and 10.

Figure 9:
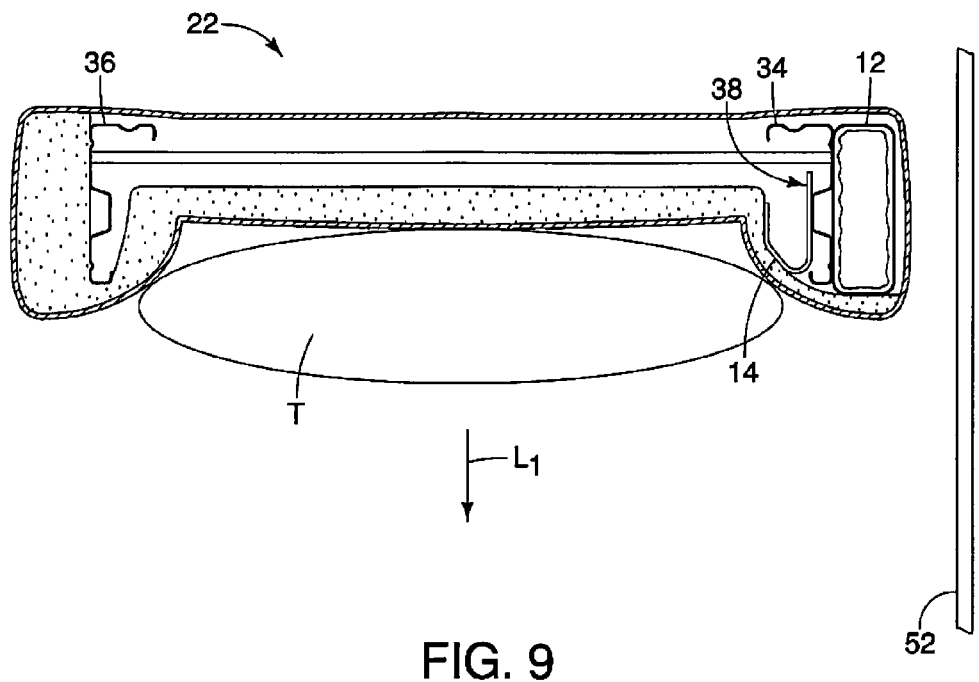
FIG. 9 is a cross-sectional view of the seatback showing a seat occupant's torso leaning against the seatback in accordance with the first embodiment.
Figure 10:
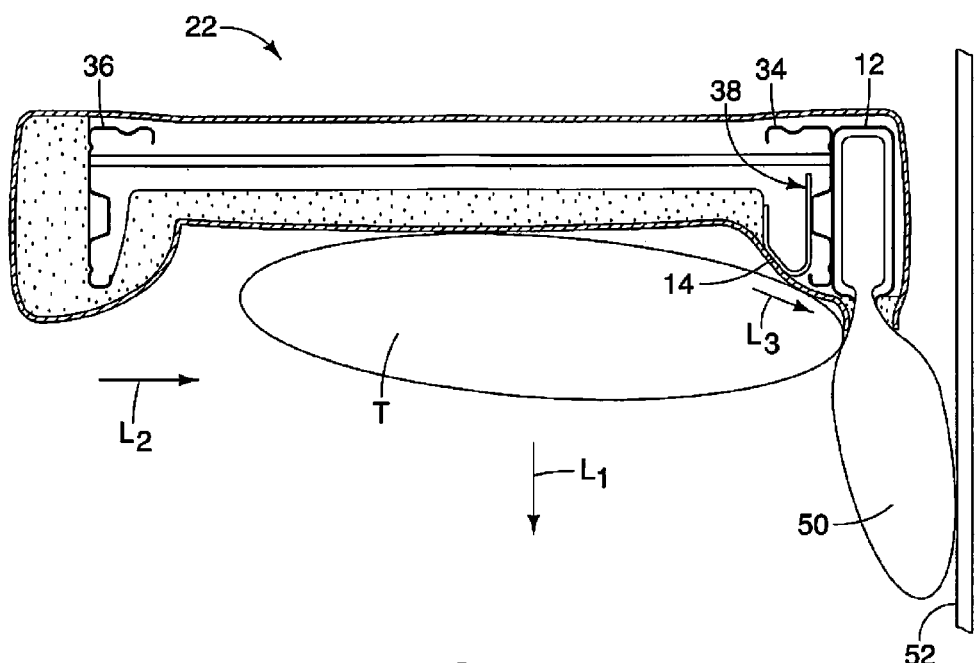
FIG. 10 is another cross-sectional view of the seatback similar to FIG. 9, showing the seat occupant's torso being urged in a forward lateral direction into the deployed airbag in response to a side impact event in accordance with the first embodiment.

FIGS. 9 and 10 include an indication of a vehicle longitudinal direction $L_1$, with the arrow of the direction $L_1$ pointing in a vehicle forward direction. During a side impact event where a vehicle is impacted in a vehicle lateral direction $L_2$, the torso T of the seat occupant is moved laterally due to inertia. During the side impact event, as the torso T is moved the vehicle lateral direction $L_2$, the torso T contacts the contact surface 14 of the guide member 38. Simultaneously, at the inception of the impact event the airbag device 12 deploys and the deployed airbag 50 inflates, as shown in FIG. 10. Contact between the contact surface 14 and the torso T causes the lateral movement of the torso T to be altered. Initially the torso T begins moving in the vehicle lateral direction $L_2$ as a result of the impact event. Once the torso T contacts the contact surface 14, the torso T is rotated slightly and begins moving in an angled direction $L_3$, as shown in FIG. 10. The slight rotation of the torso T past the contact surface 14 urges the torso T can away from further contact with the seatback frame 22a and forward into contact with the deployed airbag 50, which absorbs the inertia of the moving torso T.

As shown in FIGS. 4, 6, 9 and 10, the contact surface 14 is non-orthogonal with respect to a plane defined by the first frame member 34 and the attachment portion 64 of the guide member 38. In the depicted embodiments, the contact surface 14 has a section that is planar. The front edge portion 62 can also be considered part of the contact surface 14 and is arcuate in shape. However, it should be understood from the drawings and the description herein that the contact surface 14 can alternatively have an arcuate shape as viewed in cross-section or from one end thereof, as in FIG. 6.

In the depicted embodiment, the guide member 38 has a substantially constant thickness along its length. In other words, the guide portion 60, the front edge portion 62 and the attachment portion 64 all have the same thickness.

As shown in FIGS. 1, 2 and 5, the contact surface 14 is located above the seating portion 20 at a level corresponding to the location of the airbag device 12. Preferably, the contact surface 14 is configured and located to deflect a portion of the torso T of the seat occupant toward the deployed airbag 50 forward of the forward edge 34b of the first frame member 34 in response to a lateral impact event. However, it should be understood from the drawings and the description herein that the contact surface 14 (and the guide member 38) can be positioned at any of a number of differing locations within the seatback 22 depending upon the overall height of the seatback 22 and the intend application of the corresponding seat assembly 10. For example, if the seat assembly 10 is a tall back captain's chair and is specifically meant for use by the driver of a vehicle, the contact surface 14 will likely be positioned at a height above the seating portion 20 but closer to the lower end 46 of the seatback 22 than the upper end 44 to correspond to the location of a vehicle operator and thus ensure that the contact surface 14 makes contact with a portion of the torso T during a side impact event. However, in a standard seat assembly 10 the contact surface 14 can be centered between the lower end 46 of the seatback 22 and the upper end 44 of the seatback 22, or may be closer to the upper end 44 than the lower end 46 of the seatback 22.

Regardless, it is preferable to have the guide member 38 and the airbag device 12 positioned along the first frame member 34 at approximately the same vertical location between the lower end 46 and the upper end 44 of the seatback frame 22a.

Second Embodiment

Figure 11:
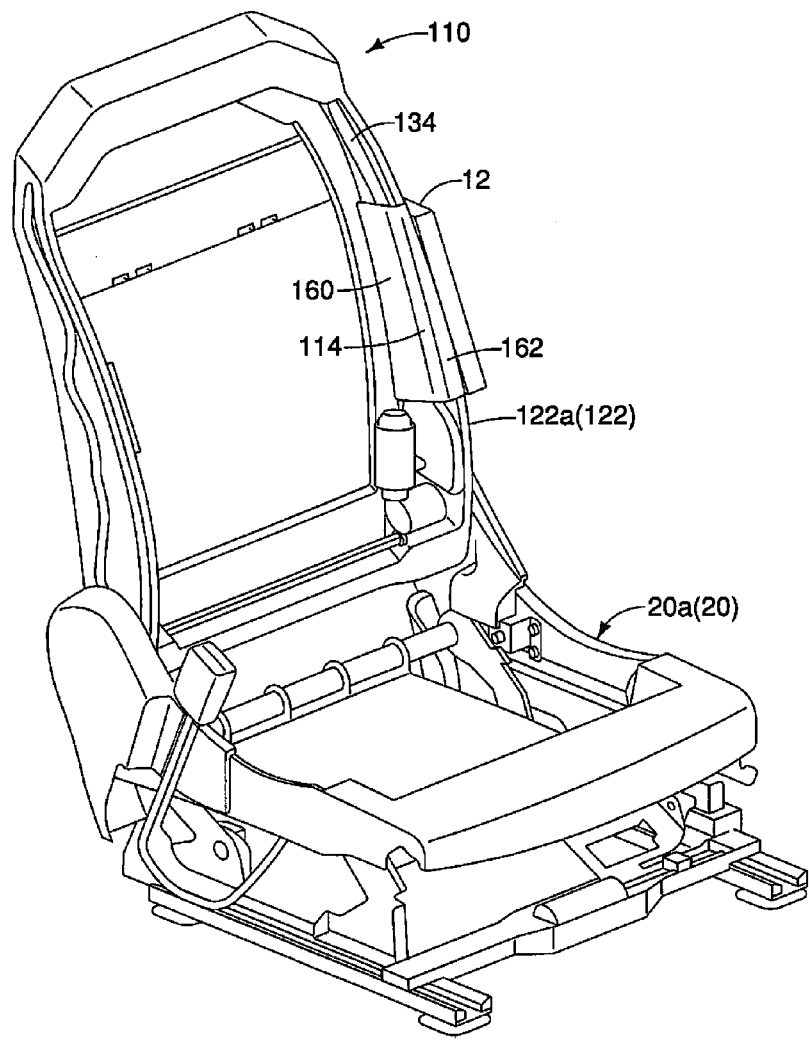
FIG. 11 is a perspective view of a seat assembly showing a seating portion frame and a seatback frame with a contact surface formed with the seatback frame in accordance with a second embodiment.
Figure 12:
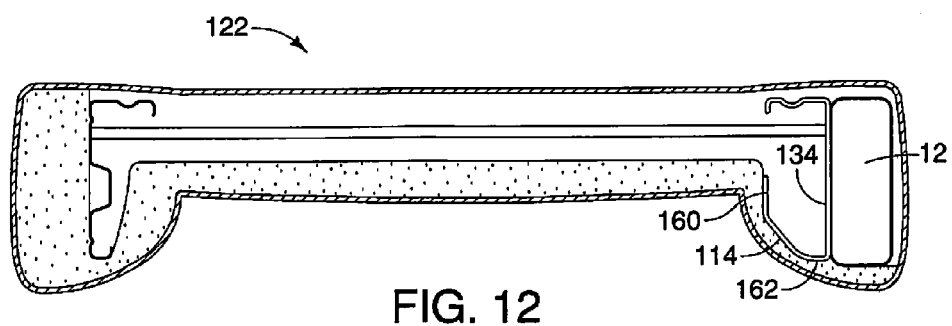
FIG. 12 is a cross-sectional view of a seatback showing the seatback frame, the airbag device and the contact surface in accordance with the second embodiment.

Referring now to FIGS. 11 and 12, a seat assembly 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The seat assembly 110 includes all of the features of the first embodiment, such as the seating portion 20 and the airbag device 12. However, in the seat assembly 110, a seatback 122 has been modified when compared to the seatback 22 of the first embodiment. Specifically, in the seatback 122, the contact surface 114 is formed on a section of a first frame member 134. The first frame member 134 includes a front edge portion 162 that is similar to the front edge portion 62 of the first embodiment, and includes a guide portion 160 that includes all of the features of the guide portion 60 of the first embedment, including the contact surface 114. The contact surface 114 serves basically the same purpose and function as the contact surface 14 of the first embodiment during a side impact event.

In the second embodiment the contact surface 114 is integrally formed with the first frame member 134 as a seamless single unitary monolithic element.

Third Embodiment

Figure 13:
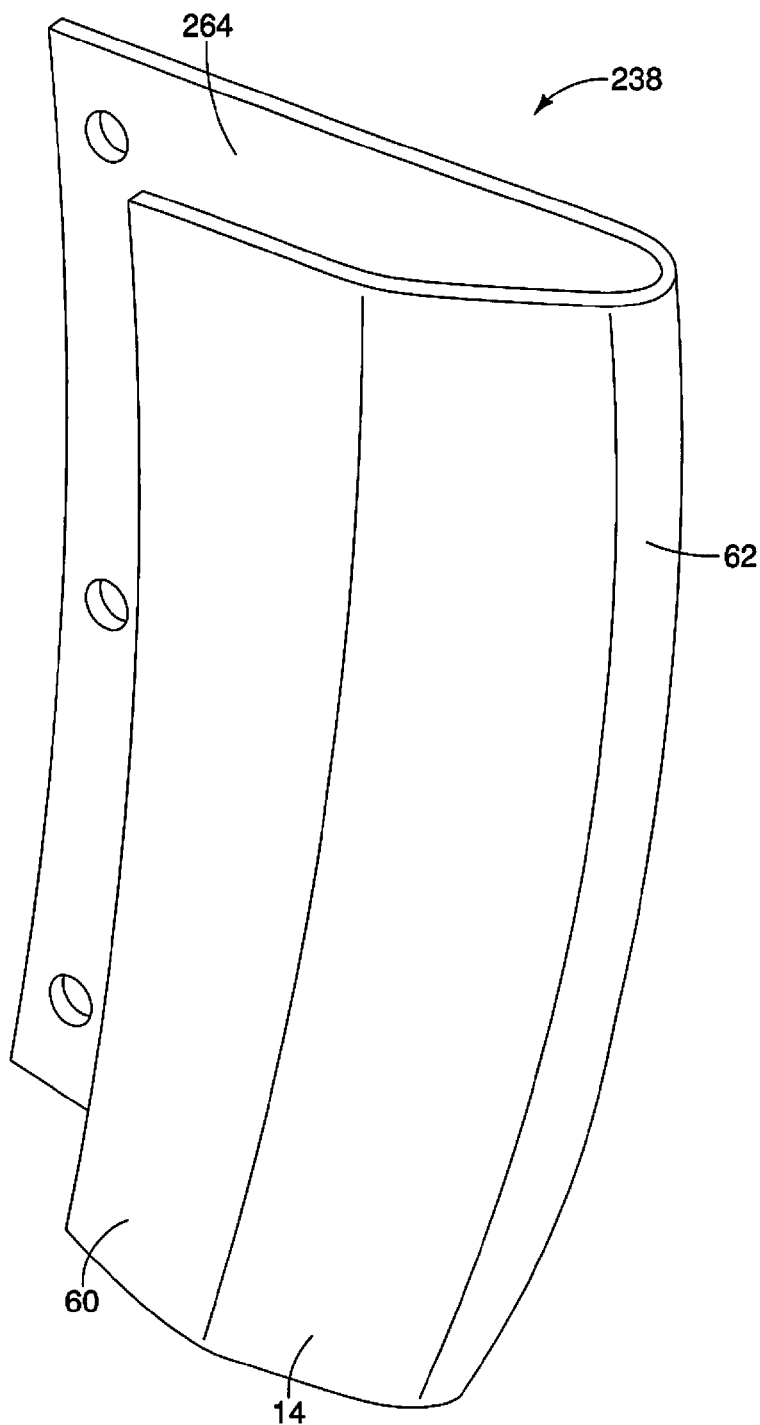
FIG. 13 is a perspective view of a guide member shown removed from a seatback frame in accordance with a third embodiment.

Referring now to FIG. 13, a guide member 238 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the guide member 238 has an attachment portion 264 that has a uniform shape along its depicted height. The guide member 238 includes the guide portion 60 and the front edge portion 62 as described above with respect to the first embodiment. Further, the guide portion 60 includes the contact surface 14, as described above.

The guide member 238 is preferably attached to a first frame member of a seatback frame by fasteners or by welding techniques.

The airbag device 12 is connected to a conventional controller (not shown) that preferably includes a microcomputer with an airbag activation and deployment control program that controls deployment of the airbag device 12 upon detection of an impact event. The controller can also include other conventional components such as an input interface circuit, an output interface circuit, and storage devices such as a ROM (Read Only Memory) device and a RAM (Random Access Memory) device. The microcomputer of the controller is programmed to control the airbag device 12.

The various seat assembly elements other than the guide member 38 and airbag device 12 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seat assembly, comprising:
   a seatback including a seatback frame having a first frame member and a second frame member extending along opposite lateral sides thereof, the first frame member having a forward edge and a rearward edge relative to the seatback being in an upright orientation;
   an airbag positioned along the first frame member and being deployable from a stowed orientation to a deployed orientation from an outboard lateral side of the first frame member such that in the deployed orientation at least a portion of the airbag is located forward of the forward edge of the first frame member; and
   a guide member having a guide portion and an attachment portion joined at a forward portion of the guide member, the attachment portion being non-movably attached to the first frame member supporting the guide portion, at least the guide portion of the guide member being disposed between the first frame member and the second frame member, a rear edge of the guide portion being cantilevered out from the first frame member with the rear edge being spaced apart from the first frame member and, the guide member being configured to deflect a portion of an occupant of the vehicle seat assembly toward the airbag forward of the forward edge of the first frame member with the airbag in the deployed orientation in response to a lateral impact event.

2. The vehicle seat assembly according to claim 1, wherein the guide member is welded to the first frame member.

3. The vehicle seat assembly according to claim 1, wherein the guide member has a front edge that extends forward toward the forward edge of the first frame member but no further forward than the forward edge of the first frame member.

4. The vehicle seat assembly according to claim 1, wherein the guide portion of the guide member is spaced laterally inboard of the first frame member.

5. The vehicle seat assembly according to claim 4, wherein the guide portion has a front edge and a rear edge, the front edge being adjacent to the first frame member and the rear edge being spaced apart from the first frame member.

6. The vehicle seat assembly according to claim 4, wherein the guide portion has a front edge that is located rearward of a forward edge of the first frame member.

7. The vehicle seat assembly according to claim 4, wherein the guide portion is angled with respect to the attachment portion.

8. The vehicle seat assembly according to claim 4, wherein the guide portion has a contact surface that engages a portion of an occupant in response to the impact event and alters the movement of the occupant during the impact event.

9. The vehicle seat assembly according to claim 8, wherein the contact surface is non-orthogonal with respect to a plane defined by the first frame member.

10. The vehicle seat assembly according to claim 8, wherein
    the contact surface has an arcuate shape as viewed in cross-section.

11. The vehicle seat assembly according to claim 4, wherein
    the guide portion and the attachment portion of the guide member define a generally U-shaped cross-section.

12. The vehicle seat assembly according to claim 1, wherein
    the guide member has a substantially constant cross-section along its length.

13. The vehicle seat assembly according to claim 1, wherein
    the seatback frame has a lower end attached to a seating portion and an upper end spaced apart from the lower end, and
    the guide member and the airbag are positioned along the first frame member at approximately the same location between the lower end and the upper end of the seatback frame.

14. A vehicle seat assembly, comprising:
    a seating portion configured to support an occupant;
    a seatback connected to the seating portion for movement between an upright orientation and a reclined orientation, the seatback including a seatback frame having a first frame member and a second frame member extending along opposite lateral sides thereof, the first frame member having a forward edge and a rearward edge, the first frame member having a guide portion that extends laterally inboard of the first frame member from the forward edge of the first frame member, the guide portion having a rear edge that is cantilevered out from the first frame member, and the rear edge being spaced apart from the first frame member, the guide portion defining a contact surface; and
    an airbag positioned along the first frame member above the seating portion with the seatback in the upright orientation, the airbag being deployable from a stowed orientation to a deployed orientation from an outboard lateral side of the first frame member such that in the deployed orientation at least a portion of the airbag is located forward of the forward edge of the first frame member, wherein the contact surface is configured to deflect a portion of an occupant of the vehicle seat assembly toward the airbag forward of the forward edge of the first frame member with the airbag in the deployed orientation in response to a lateral impact event.

15. The vehicle seat assembly according to claim 14, wherein
    the contact surface is located above the seating portion at a level corresponding to the location of the airbag.

16. The vehicle seat assembly according to claim 14, wherein
    the guide portion and the contact surface are integrally formed with the first frame member as a seamless single unitary monolithic element.

17. The vehicle seat assembly according to claim 14, wherein
    the first frame member defines an upright portion between the forward edge and the rearward edge with the seatback in the upright orientation, the guide portion and the upright portion defining a U-shape as viewed in cross-section such that the guide member is disposed between the first frame member and the second frame member.

18. The vehicle seat assembly according to claim 14, wherein
the guide portion and the contact surface are spaced laterally inboard of the first frame member.

19. The vehicle seat assembly according to claim 14, wherein
the guide portion and a portion of the guide portion defining the contact surface are cantilevered out from the first frame member.

\* \* \* \* \*